(12) United States Patent
Thompson et al.

(10) Patent No.: US 6,985,174 B1
(45) Date of Patent: Jan. 10, 2006

(54) DYNAMIC RADIO FREQUENCY INTERFERENCE DETECTION AND CORRECTION

(75) Inventors: Peter A. Thompson, Milbrae, CA (US); Thomas C. Lyon, San Jose, CA (US)

(73) Assignee: Logitech Europe S.A., (CH)

( * ) Notice: Subject to any disclaimer, the term of this patent is extended or adjusted under 35 U.S.C. 154(b) by 553 days.

(21) Appl. No.: 10/000,105

(22) Filed: Oct. 30, 2001

(51) Int. Cl.
*H04N 17/00* (2006.01)
(52) U.S. Cl. .................... 348/180; 348/194; 348/616
(58) Field of Classification Search ................ 348/180, 348/184, 192, 193, 643, 194, 505, 506, 509, 348/616, 21, 706, 705, 617, 624
See application file for complete search history.

(56) References Cited

U.S. PATENT DOCUMENTS

| | | | | |
|---|---|---|---|---|
| 4,361,853 A | * | 11/1982 | Remy et al. ................. | 348/616 |
| 4,914,745 A | * | 4/1990 | Strehl ......................... | 348/616 |
| 5,327,238 A | * | 7/1994 | Chou ......................... | 348/473 |
| 5,335,010 A | * | 8/1994 | Lindemeier et al. ........ | 348/706 |
| 5,550,595 A | | 8/1996 | Hannah ...................... | 348/552 |
| 5,583,569 A | | 12/1996 | Kuzma ....................... | 348/239 |
| 5,675,512 A | | 10/1997 | Ireton et al. ............. | 364/514 R |
| 5,699,277 A | | 12/1997 | Munson et al. .......... | 364/514 R |
| 5,748,234 A | | 5/1998 | Lippincott .................. | 348/222 |
| 5,751,809 A | | 5/1998 | Davis et al. ................. | 380/23 |
| 5,760,794 A | | 6/1998 | Munson et al. ............. | 345/515 |
| 5,784,099 A | | 7/1998 | Lippincott .................. | 348/222 |
| 5,786,865 A | * | 7/1998 | Ayzenberg et al. ......... | 348/505 |
| 5,818,441 A | | 10/1998 | Throckmorton et al. .... | 345/328 |
| 5,854,640 A | | 12/1998 | North et al. ................ | 345/515 |
| 5,859,664 A | * | 1/1999 | Dent ........................... | 348/21 |
| 5,946,396 A | | 8/1999 | Davis ......................... | 380/23 |
| 5,961,589 A | | 10/1999 | Hansen ....................... | 709/205 |
| 5,966,446 A | | 10/1999 | Davis ......................... | 380/25 |
| 5,978,047 A | * | 11/1999 | May ........................... | 348/616 |
| 5,982,425 A | | 11/1999 | Allen et al. ................. | 348/231 |
| 6,005,638 A | * | 12/1999 | Blair et al. ................. | 348/607 |
| 6,008,777 A | | 12/1999 | Yiu ............................. | 345/2 |

\* cited by examiner

*Primary Examiner*—Victor R. Kostak
(74) *Attorney, Agent, or Firm*—Fenwick & West LLP

(57) ABSTRACT

A system and method providing dynamic detection and correction of data corrupted by external interference in wireless communications network includes an interference detection unit and correction unit. Detection unit detects impact on video signals based on measuring condition of predetermined portion of video signals. Correction unit corrects the interference by selecting previously stored data to replace corrupted video data.

22 Claims, 12 Drawing Sheets

DYNAMIC RADIO FREQUENCY INTERFERENCE DETECTION AND CORRECTION

BACKGROUND OF THE INVENTION

1. Field of the Invention

The present invention relates generally to a system and method of transmitting television broadcast signals, in particular, to a system and method of dynamically detecting damage to video signals caused by external interference, or sporadic nulls, and repairing damaged video signals.

2. Description of the Background Art

Wireless communications devices are proliferating at a rapid pace in recent years. For example, in the area of personal area network (PAN), it becomes increasingly desirable to use cable-free connections for data exchange or communication between devices such as desktop computers, mobile computers, handheld devices, mobile phones, digital cameras, and printers.

For example, an increasing number of wireless devices are now developed using Bluetooth™ technology for wireless communications. Bluetooth, commonly known as a wireless PAN technology for short range delivery of digital data or voice, transmits signals in unlicensed 2.4 GHz band and uses frequency hopping spread-spectrum ("FHSS") technique that changes its frequency 1600 times per second. HomeRF™ (Home Radio Frequency), another PAN technology, also operating on the 2.4 GHz range, changes 50 times per second to transmit digital voice and data between mobile devices and desktop devices within a range of 150 feet. These emerging technologies eliminate the need of numerous and inconvenient cable connections between electronic devices.

However, one of the problems associated with these growing wireless communications technologies is the interference they may cause to other wireless transmissions that are carried within the same or overlapping frequency range. In particular, in an FHSS environment using Bluetooth and other wireless technologies using the frequency hopping technique, certain types of wireless data or voice transmissions are vulnerable to such interference.

For example, when a digital camera captures live motion video or still images and transmits the video signals wirelessly to a host computer using the same 2.4 GHz band and a raster-based system, e.g., NTSC (National TV Standards Committee) or PAL (Phase Alternating Line) compatible system, the loss of data due to the interference from Bluetooth or other wireless FHSS devices causes artifacts and flickers in the video images. As the number of the external Bluetooth transmissions increases, the interference becomes even worse and significantly deteriorates the quality of the video.

Therefore, it is desirable to have a system and method of effectively detecting the outside interference caused by Bluetooth or other radio frequency transmissions, and repairing the corrupted data. In particular, in broadcasting video signals, the desired method and system is capable of dynamically detecting the affected video signals and correcting the corrupted data for real time video or still images to improve the overall quality of the video images.

BRIEF SUMMARY OF THE INVENTION

The present invention overcomes the deficiencies and limitations of wireless communications network by detecting external radio frequency interference impact upon video signals and repairing damage caused to those video signals. In accordance with one embodiment of the present invention, a system detects whether video signals are distorted or corrupted during signal transmission and repairs lost data caused by the interference. By doing so, the present invention improves the quality of broadcasting real time video or still video images.

In one embodiment, an interference detection unit is provided to check the condition of the horizontal synchronization (Hor Sync) pulse and color burst pulse, which normally exist in signals generated by a raster-based system, e.g., NTSC or NTSC like signals for each line displayed. If the Hor Sync and the color burst pulse are damaged, the detection unit generates a bad line flag to indicate that the line is damaged. The video data corresponding to the damaged line are flattened to a predetermined value.

A correction unit is provided to repair the damaged lines by replacing the video data of the damaged line with that of equivalent line on other frames. In one embodiment, the correction unit stores a predetermined number of frames. The frames are temporally close to the frame that has bad line to be repaired. The correction unit selects a good line on one of the frames to replace a damaged line.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE INVENTION

Figure 1:
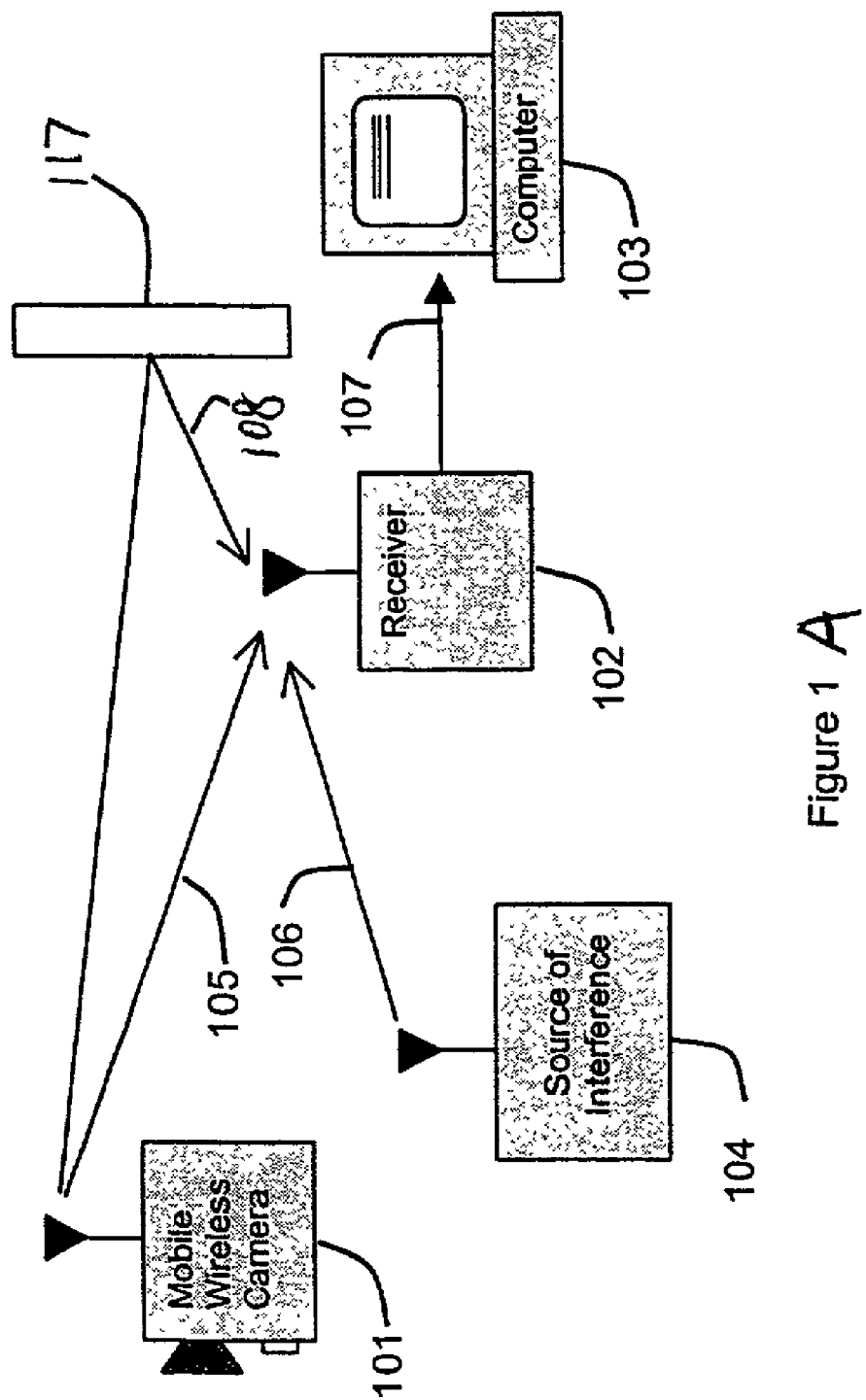
FIG. 1A illustrates a wireless communications network environment in accordance with an embodiment of the present invention.
FIG. 1B is a block diagram of a wireless video interference detection and correction system.

Reference will now be made in detail to several embodiments of the present invention, examples of which are illustrated in the accompanying drawings. It is noted that wherever practicable similar or like reference numbers may be used in the figures and may indicate similar or like functionality. One of skill in the art will readily recognize from the following discussion that alternative embodiments of the structures and methods disclosed herein may be employed without departing from the principles of the invention disclosed herein.

FIG. 1A illustrates an embodiment of a wireless communications network environment, in which a system of detecting and correcting external interference in accordance A with the present invention is implemented.

A video camera 101 captures still images or video, records audio signals and transmits them wirelessly to a receiver 102 in a modulated signal 105. In one example, the video signal in the modulated signal 105 is in conventional television broadcasting format, e.g., NTSC or PAL. The carrier frequency and bandwidth of signal 105 may vary depending on the actual needs for signal transmission. In one embodiment, signal 105 uses 2.4 GHz as carrier frequency to achieve sufficient bandwidth and reliability.

Receiver 102 receives the modulated video and audio signal 105. It converts audio and video signal 105 into a digital stream 107 and sends it to computer 103 for further processing. Image or video processing software can be used to process the received video and audio signals for various applications, such as video email, video conference and security monitoring.

During the course of transmitting signal 105 from camera 101 to receiver 102, external source of interference 104 may cause damage to signal 105 in a variety of means or even prevent receiver 102 from receiving modulated signal 105. Typical source of interference 104 includes wireless radio frequency (RF) broadcast signals that use the same or overlapping frequency as signal 105 uses. For example, wireless RF technologies such as Bluetooth and HomeRF, broadcast signals at the 2.4 GHz radio frequency band. These RF technologies typically use frequency hopping spread spectrum techniques to prevent from external interference. However, these RF radiations themselves cause interference 106 to other wireless transmisisons. As another example, home microwave devices and devices that uses IEEE 802.11B DSSS modulation, can also cause interference when they operate on the same or overlapping frequency as the modulated signal 105.

Other common problems can cause failure of signal transmission between wireless camera 101 and receiver 102. For example, camera 101 goes out of range that receiver 103 can receive; modulated signal 105 is blocked by walls. As shown in FIG. 1, one example is the reflected signal 108 which is reflected off wall 117. Signal 108 adds to signal 105 at the receiver 102. If signal 108 is near 180 degrees out-of-phase, with signal 105, signal 108 will diminish the effective signal at receiver 102. For microwave signals, the effect can occur as camera 101 is rapidly moved to the wall 117 within short distances, which is usually referred to as a null space. As described below, the present invention is not only capable of correcting interference caused by external wireless radiation interference, but also minimizing effects of moving in and out of these null spaces.

Figure 1B:
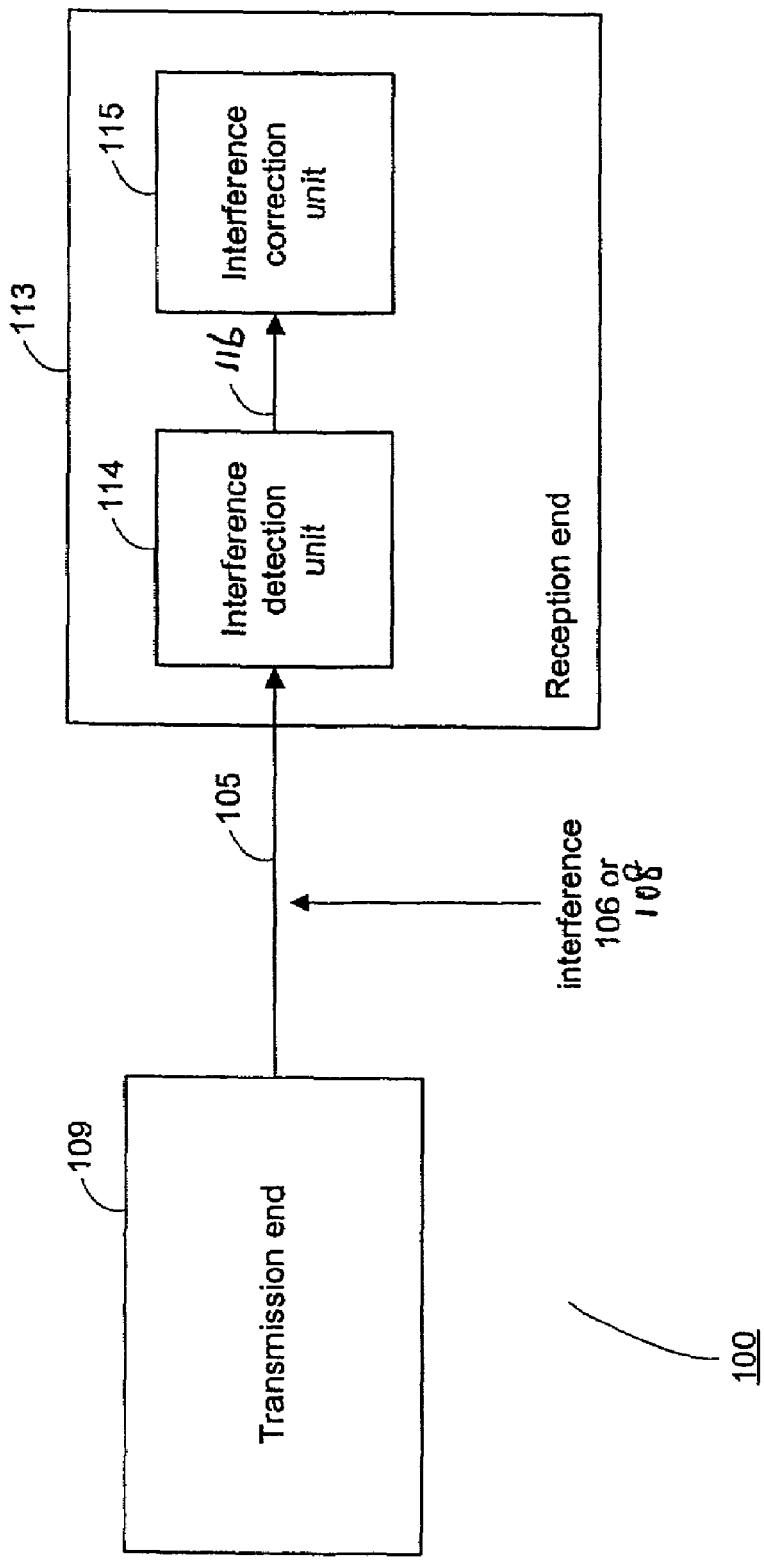

FIG. 1B is a block diagram of a video interference detection and correction system 100 according to one embodiment of the present invention. System 100 includes a transmission end 109 and a reception end 113. Reception end 113 includes an interference detection unit 114 and an interference correction unit 115.

In one embodiment, transmission end 109 generates modulated signal 105 and transmits signal 105 using conventional television spectrum. Signal 105 might suffer from external interference 106 or 108. Detection unit 114 receives signal 105 and decodes signal 105 into digital video data. Detection unit 114 detects if there is any interference damaging the received video signal 105 and identifies corresponding damaged video data. Interference correction unit 115 receives video data 117 from the detection unit 114 and repairs the damaged data.

Figure 2:
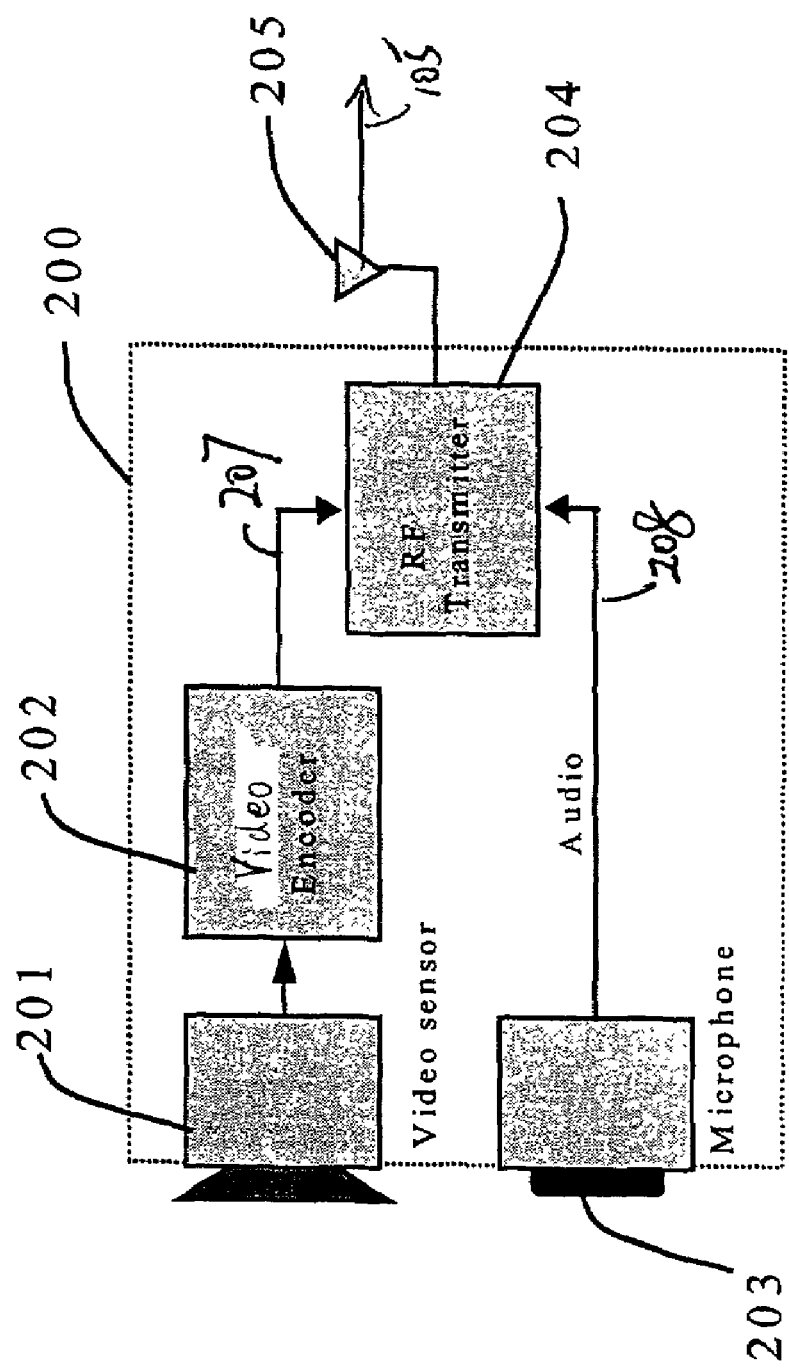
FIG. 2 is a block diagram illustrating an embodiment of a video transmission end.

FIG. 2 illustrates an embodiment of transmission end 109. Transmission end 109 has a video sensor 201, a video encoder 202, a microphone 203, a RF transmitter 204 and an antenna 205.

One of the function of transmission end 109 is to convert sounds and images into electrical signals. It also frequency modulates these signals for output on the antenna 205. Video sensor 201 captures motion videos or still images. For example, video sensor 201 may operate under a standard VPCM (Video Preview and Capture Mode) to monitor, or capture, real time video; it may also capture still images under SCM mode (Still Capture Mode).

Video sensor 201's output is further encoded by video encoder 202. In one embodiment, video encoder 202 is a NTSC encoder and is capable of converting video signals into NTSC composite video signal 207. Composite video signal 207 is sent to RF transmitter 204 and transmitted to detection unit 114 as signal 105.

As understood, under NTSC television format, NTSC composite video signal 207 contains 30 complete frames (images) in each second. Each frame is broken into two interlaced fields, one containing the odd lines, referring to as odd field, and the other containing the even lines, referring to as even field. Each video frame contains 525 lines, of which only 505 lines contain video information and remaining 20 lines are reserved for synchronization pulses. Each line of a NTSC video field lasts for approximately 63.5 microseconds. Each field of the NTSC signals starts with a group of vertical synchronization (sync) pulses, followed by successive lines of active video information separated by horizontal sync pulses. The vertical and horizontal sync pulses mixed with the actual picture information are normally used in a television receiver to synchronize the vertical and horizontal deflection circuits to match the video being displayed. As will be illustrated below, these characteristics of television composite videos are used advantageously to detect and correct the interference caused to signal 105.

Note that PAL television format, another popular television composite video format, has similar characteristics. For the ease of description, the specification will use NTSC video as an example to describe the interference detection and correction. It should be understood that the principles of invention are equally applied to PAL or other composite video format. One of ordinary skill in the art will be able to practice the present invention to detect and correct interference that damage video signal in these composite video format based on the description of examples using NTSC video.

Moreover, this present invention is applicable to all other video capture systems that are capable of generating raster graphics. When such graphics are encoded into either composite video or component video signals, and modulated at a transmission end to broadcast, the interference or sporadic nulls occurring to the graphics images can be detected and corrected by the present invention. The discussion of any specific video format, such as NTSC, NTSC like, PAL or PAL like video signals in the description does not restrict the scope of this invention in any manner.

FIG. 2 also shows that microphone 203 generates and sends audio signal 208 to RF transmitter. RF transmitter 204 modulates audio signal 208 with video signal 207 and amplified them to deliver modulated signal 105 to detection unit 114 via antenna 205.

When RF transmitter 204 broadcasts modulated video or audio signal 105 using the NTSC or PAL broadcast spectrum at a 2.4 GHz carrier signal, the resulting bandwidth of the composite video signal spans from, for example, about 12 MHz in the 2.4 GHz to 2.485 GHz band. As mentioned above, when this frequency range overlaps with the bandwidth used by other wireless technologies, for example, Bluetooth or HomeRF, interference may inadvertently occur to damage the transmitted composite video signal. The benefit of the present invention is to provide a dynamic scheme to detect the interference and repair damage to video images.

Figure 3:
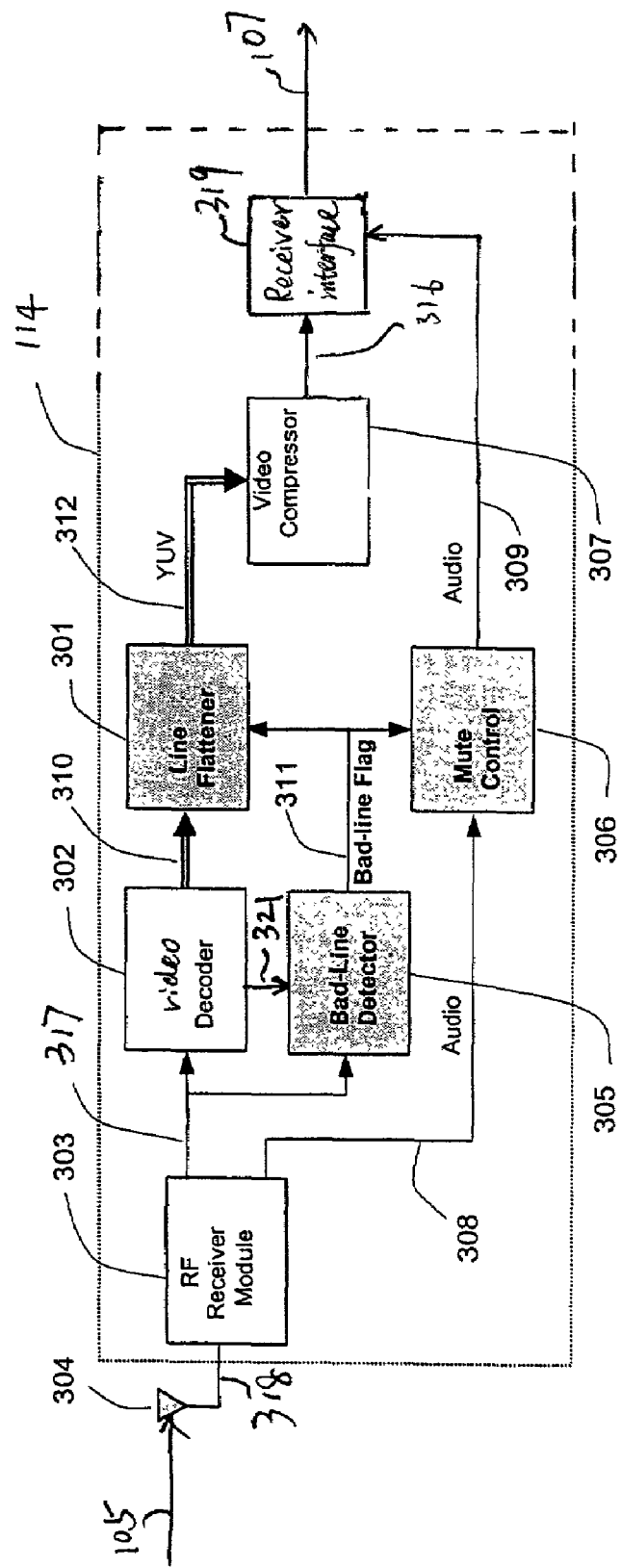
FIG. 3 is a block diagram illustrating an embodiment of a video interference detection unit.

FIG. 3 illustrates an embodiment of interference detection unit 114. Detection unit 114 has an antenna 304, a RF receiver module 303, a video decoder 302, a line flattener 301, a bad-line detector 305, a mute control 306, a video compressor 307 and a receiver output interface. RF receiver module 303 has an input to receive video signal 318 from antenna 304. RE receiver module 303 sends a video output 317 to video decoder 302 and bad-line detector 305, and an audio ouput 308 to mute control 306. Video decoder 302 generates output 310 to line flattener 301. Line flattener 301 also receives another input 311 from bad-line detector 305. Line flattener 301 is further coupled to video compressor 307. Video compressor 307 also receives audio input 309 from mute control 306. Video compressor 307 outputs video and audio signal 316 to correction unit 115 through receiver interface 107.

During the operation of detection unit 114, RF receiver module 303 receives modulated audio and video signal 105 from transmission end 109 at antenna 304. In one embodiment, RF receiver module 303 is a tuner and demodulator. RF receiver module 303 demodulates received RF signal 318 and generates video signal 317 and audio signal 308. In one example, video signal 317 is NTSC composite video signal when transmission end 109 generates video in NTSC spectrum.

Demodulated video signal 317 is sent to video decoder 302. Video decoder 302 converts received video signal into digital component video data 310. For example, video decoder 302 converts NTSC composite video into YUV video component data. YUV component video format, under which each pixel on a NTSC field is represented by luminance (Y) and chrominance components (U and V), saves data storage space and transmission bandwidth compared to RGB (Red, Green, Blue) format. Video data 310 in YUV format require less data throughput on video compressor 307 which couples detection unit 114 to correction unit 115.

While video decoder 302 converts composite video signal 317, bad-line detector 305 also receives composite video signal 317. As will be described in detail below, bad-line detector 311 detects if there are any bad lines in received video signal 317 that have been damaged by external interference. If a bad line is detected, bad-line detector 311 asserts a line-status flag, e.g., bad-line flag 311, and sends such line status flag to line flattener 301. Line flattener 301 will use the bad-line flag 311 to determine which line is damaged or not. In order to perform the bad-line detection, in a preferred embodiment, bad-line detector 305 receives a horizontal sync reference timing signal 321 from video decoder 302. As will be understood below, signal 321 contains a self-generated horizontal sync signal such that bad-line detector 305 can accurately detect the horizontal sync signal in video signal 317 in spite of the presence of noise in the signal 317. In one implementation, signal 321 is generated by a phase-lock loop circuit that are typically found in video decoder 302. The phase-lock loop circuit is capable of producing an H-rate (Hor Sync) timing signal. When the circuit receives the video signal 317, it compares the horizontal sync edges with the internally produced H-rate signal edges to generate a correct reference signal to indicate where the horizontal signal starts. Such reference signals are sent to bad-line detector 305 where correct horizontal sync information may be needed as understood below with reference to FIG. 5. In an alternative embodiment, a dedicated hardware to produce such timing reference signal 321 may be coupled to RF receiver module 303 to receive an input of signal 317. Its output is coupled to bad-line detector 305 to send the reference signal 321.

Line flattener 301 receives video data 310 from video decoder 302. If a bad-line flag 311 is asserted to video data 310 corresponding to a line, line flattener 301 will modify the damaged video data 310 and modify the data 310 to a same value, i.e., changing the data representing every pixel on the damaged line to a predetermined value. The processing within line flattener 301 will signal the presence of video damage to interference correction unit 115. The advantage of video flattening is to lower the data throughput in subsequent data processing at video compressor 307 and receiver interface 319. In an alternative implementation, bad-line flags 311 could be inserted into video data 310 directly and video data 310 will then be sent to compressor 307 and eventually to correction unit 103 through receiver interface 319. This approach might increase the data throughput since bad-line flags 311, e.g., one bit per line, and correspondingly the overhead to process these bad-line flags at compressor 307 and correction unit 103. Other means of sending the bad-line flags to the correction unit 103 include sending it by way of a USB control channel.

Video compressor 307 receives video data 312 from line flattener 301, which may contain flattened bad lines. Video compressor 307 compresses video data and packetizes them for delivery to correction unit 115 through receiver interface 319. In one embodiment, receiver interface 319 is a USB interface. Compressor 307 compresses data appropriately so that the compressed data comply with USB interface requirement. In alternative embodiments, the interface between detection unit 114 and correction unit 115 can also be other commonly used computer video processing interface.

Mute control 306 receives demodulated audio signal 308 and bad-line flag 311. If bad-line flag 311 is asserted for a damaged line, corresponding audio signal for the same line is muted by mute control 306. The mute control 306 simply attenuates the audio voltage by 20 dB (or other reasonable amount) during the time that Bad-Line Flag signal 311 is asserted. The output 309 of mute control 306 is received by receiver interface 319, which packetizes audio signals and delivers them together with video data to correction unit 115 as the signal 107.

Figure 4:
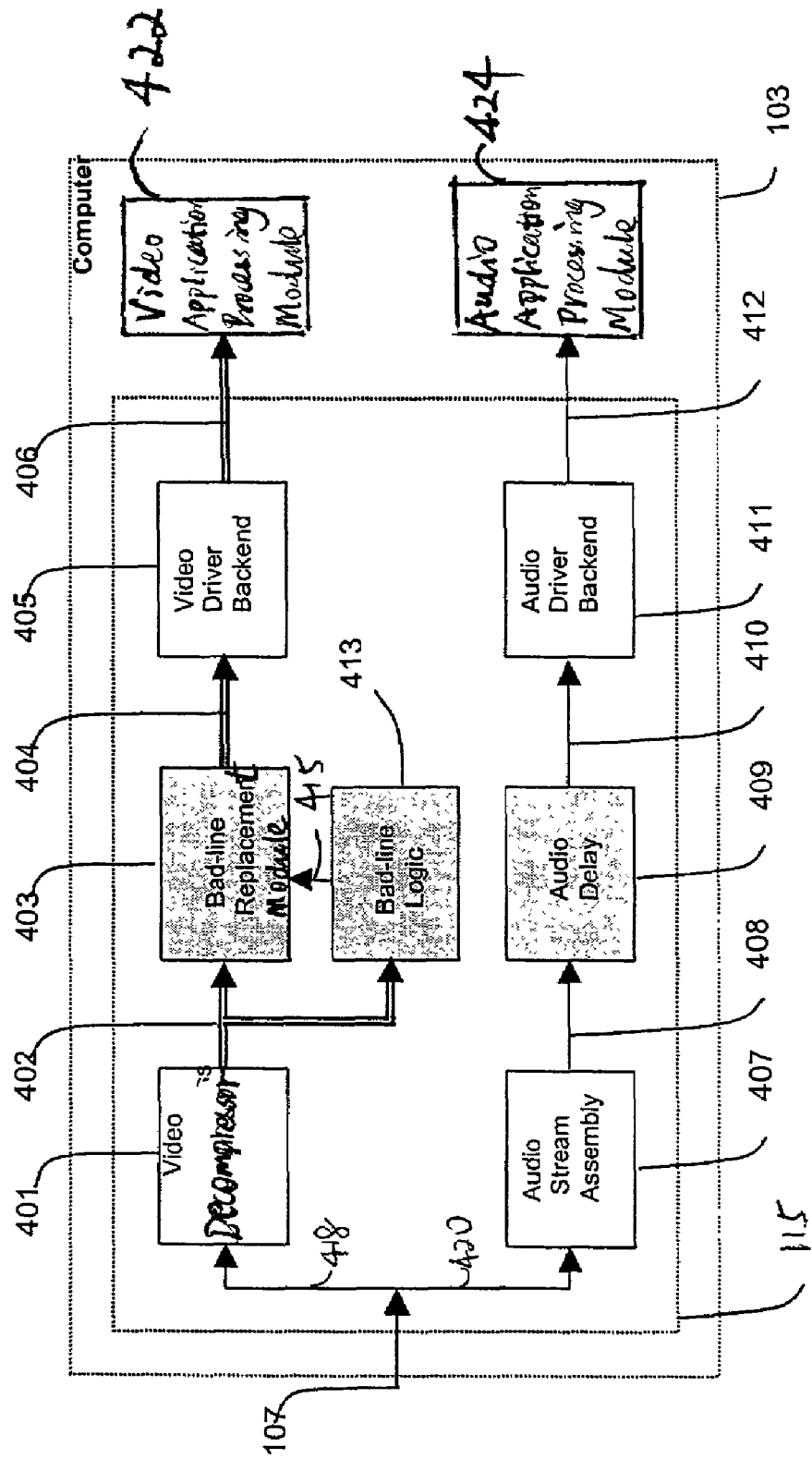
FIG. 4 is a block diagram illustrating an embodiment of a video interference correction unit.

FIG. 4 further illustrates an embodiment of correction unit 115. Correction unit 115 is typically located in a computer, such as the computer 103 as shown in FIG. 1. Correction unit 115 contains a video decompressor 401, a bad-line replacement block 403, a bad-line logic 413, a video driver backend 405, an audio stream assembly block 407, an audio delay 409 and an audio driver backend 411.

Video decompressor 401 has an input 418 from detection unit 114 and audio stream assembly 407 receives input from the output of detection unit 114. Video decompressor 401 has an output 402 respectively coupled with bad-line replacement module 403 and bad-line logic 413. Bad-line logic 413 is coupled with bad-line replacement module 403. Video driver backend 405 receives video data 404 from bad-line replacement module 403 and sends corrected video data 406 to video application processing module 422 in computer 103.

Correspondingly, audio signals 420 go into audio stream assembly 407 first and then are received by audio delay 409. The audio stream assembly block 407 takes the USB packets of audio and assembles them into a real-time digital audio stream. Audio driver backend 411 receives appropriately delayed audio signals and delivers them as output 412 to an audio application processing module 424 in computer 103. Computer 103 can use audio signals 412 and video data input 406 in multiple applications, such as video display and audio playback.

During the operation, video decompressor 401 collects and decompresses input video data 418. In a preferred embodiment, video decompressor 401 first assembles the USB packets, from 418, into a frame, and then decompresses them such that output video data 402 correspond to all pixels for each video frame. As will be described below, bad-line replacement module 403 will store data of contiguous frames and select good lines on other frames to repair bad lines. Bad-line logic 413 detects whether video data 402 contain bad lines, which have been flattened by line flattener 301. As described above, damaged video data 402 have been reset values by line flattener 301. Thus, bad-line logic 413 can identify what portion of data in video data 402 are damaged and should be replaced. Bad-line replacement module 403 receives decompressed data 402 and input 415 from bad-line logic 413. Bad-line replacement module 403 has buffers to store data corresponding to each frame and then selects good equivalent lines on one frame to repair bad line on other frame. Repaired video data will be then delivered to computer 103 via video driver backend 405.

For audio signals input, audio stream assembly block 407 collects audio packets 420 from data bus 107 and passes audio signal as a digital stream 408, to audio delay module 409. Audio delay module 409 adds delay time to audio stream so that its timing is synchronized with video stream, which may be delayed by processing modules 401, 403 and 413. In an alternative embodiment, audio delay module 409 has a firmware to correct any noise within the audio signal 408. Digital audio stream 410 is then transferred to audio driver backend 411, where it can be converted into a form that audio application processing module 424 can use.

Figure 5:
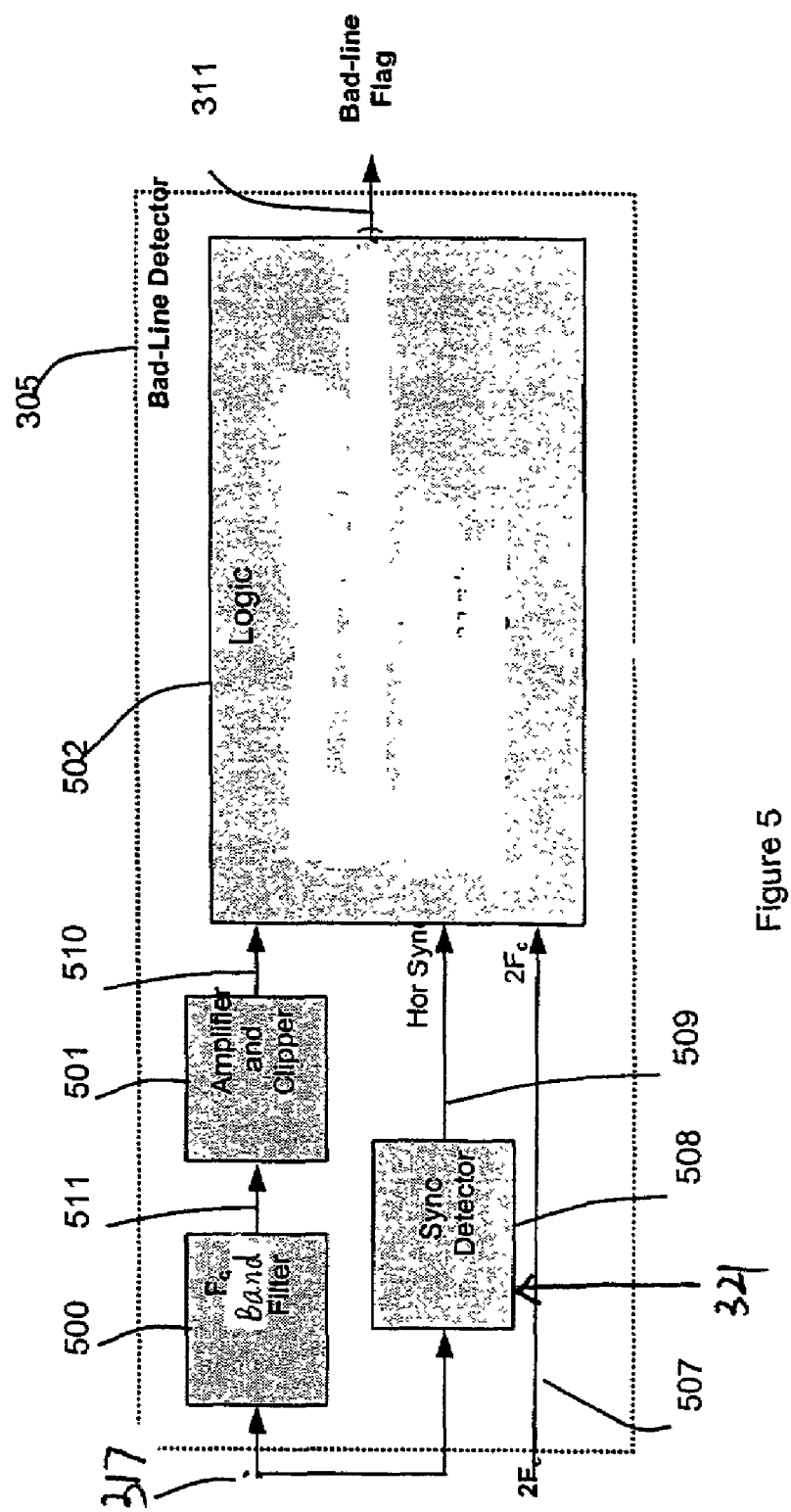
FIG. 5 is a block diagram illustrating an embodiment of a bad-line detector.

Reference is now made to FIG. 5 further describing an embodiment of bad-line detector 305. As described above, bad-line detector 305 is capable of detecting whether video signal 317 has been damaged by external interference and generating bad-line flags to indicate presence of bad lines. In one embodiment, bad-line detector 305 has an $F_c$ band filter 500, an amplifier and clipper 501 and a logic unit 502 and a sync detector 508. $F_c$ corresponds to the frequency used for color modulation. $F_c$ band filter 500 and sync detector 508 receives input 317. $F_c$ band filter 500's output is coupled to amplifier and clipper 501. Amplifier and clipper 501 outputs signal 510 to logic unit 502. Logic unit 502 also receives input from sync detector 509, which detects horizontal pulse in composite video signal as described below. In addition, logic unit 502 receives clock information 507, which is typically a clock signal at a frequency of twice of $F_c$. Logic unit 502 generates a bad-line flag 311 and sends it to video flattener 301 and mute control 306.

For the purpose of description, assuming that input 317 is NTSC video, $F_c$ as a typical frequency of color modulation for NTSC format video, is 3.57 MHz. During the operation of bad-line detector 305, $F_c$ band filter 500 blocks received composite video signal except for color information. Thus, the output of $F_c$ band filter 500 is a color signal 511, which is typically a low amplitude sine wave. The color burst portion of a line, see FIG. 6 signal 601, is normally used to phase lock the decoder's color demodulator circuits. It is used in this invention to detect a good video line. Amplifier and clipper 501 amplifies and clips color signal 511 and produces a square wave 510. As described below, square wave 510 will be sent to logic unit 502. Logic unit 502 counts the number of burst edges within the clipped color burst 601 portion of the line, and uses it as one of the criteria to decide whether the color burst signal 511 is damaged or not. If the number of burst edges is fewer than normal color burst, the condition of color burst signal 601 may reflect if the original composite video signal 105 suffers from interference. The color burst portion of the line is derived from the horizontal sync signal 509. For NTSC the color burst signal 601 starts 0.84 microseconds after the rising edge of the horizontal sync signal 509 and is active for 2.5 microseconds.

Correspondingly, sync detector 508 strips color and luminance information, i.e., active video pulse, from the composite signal NTSC signal 317 and outputs horizontal synchronization (Hor Sync) signal 509 that is typically present in NTSC signal. As noted above, to gain the correct Hor Sync information, sync detector 508 receives the reference timing signal 321 from video decoder 302 in a preferred embodiment. This reference timing signal enables sync detector 508 to have correct timing information for Hor Sync 509 even though the Hor Sync in signal 317 is damaged. As a result, logic unit 502 has inputs of clipped burst 510, Hor Sync signal 509 and $2F_c$ signal 507, which is at 7.16 MHz for NTSC composite video.

In one embodiment, logic unit 502 analyzes composite video signal 317 corresponding to each line on a video field. To detect interference, logic unit 502 determines whether normal pulses of such composite video signal are still good and present at right timing. If not, logic unit 502 will issue a bad line flag to identify a damaged line.

Figure 6:
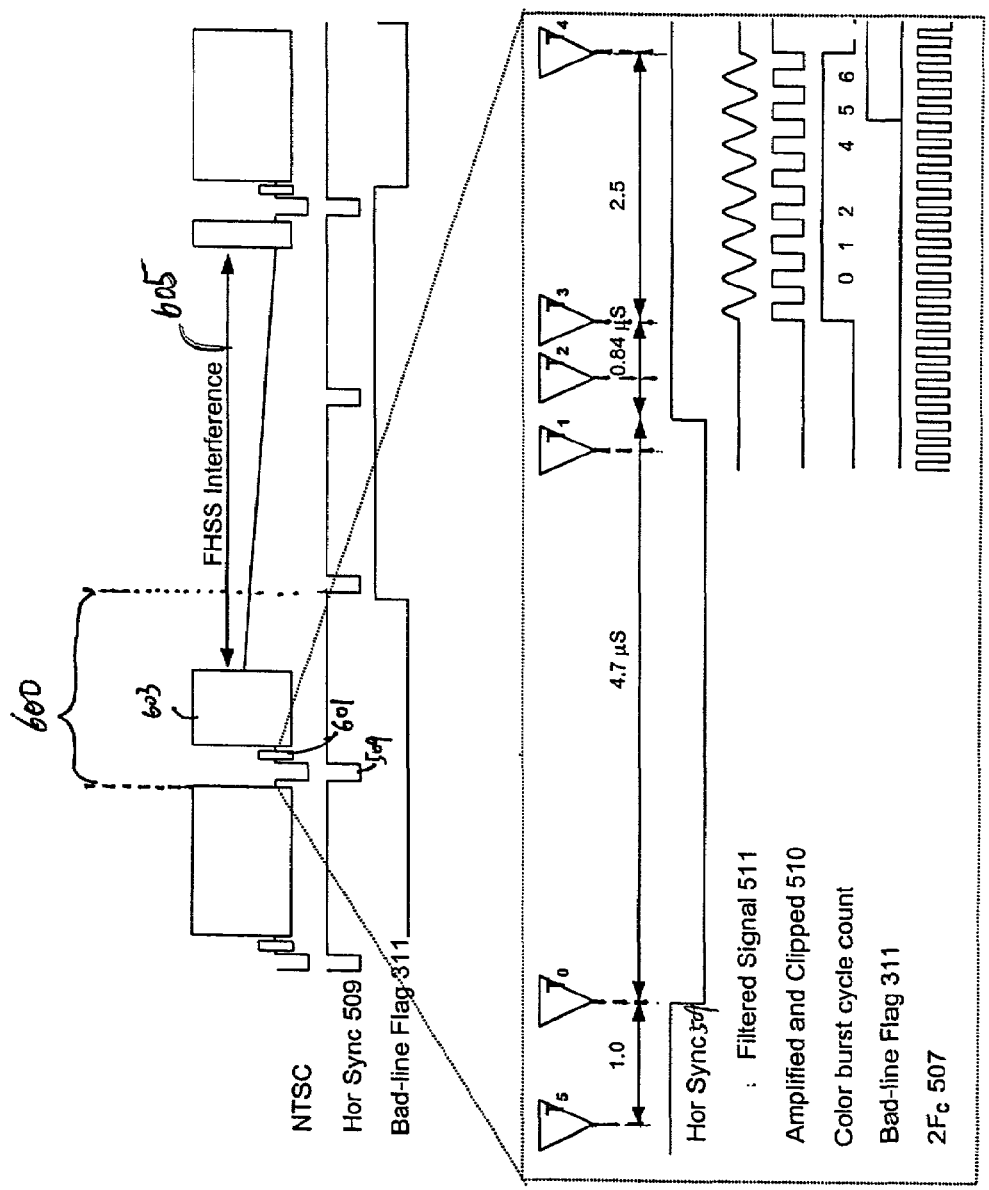
FIG. 6 is a timing diagram illustrating bad line detection process.
Figure 7:
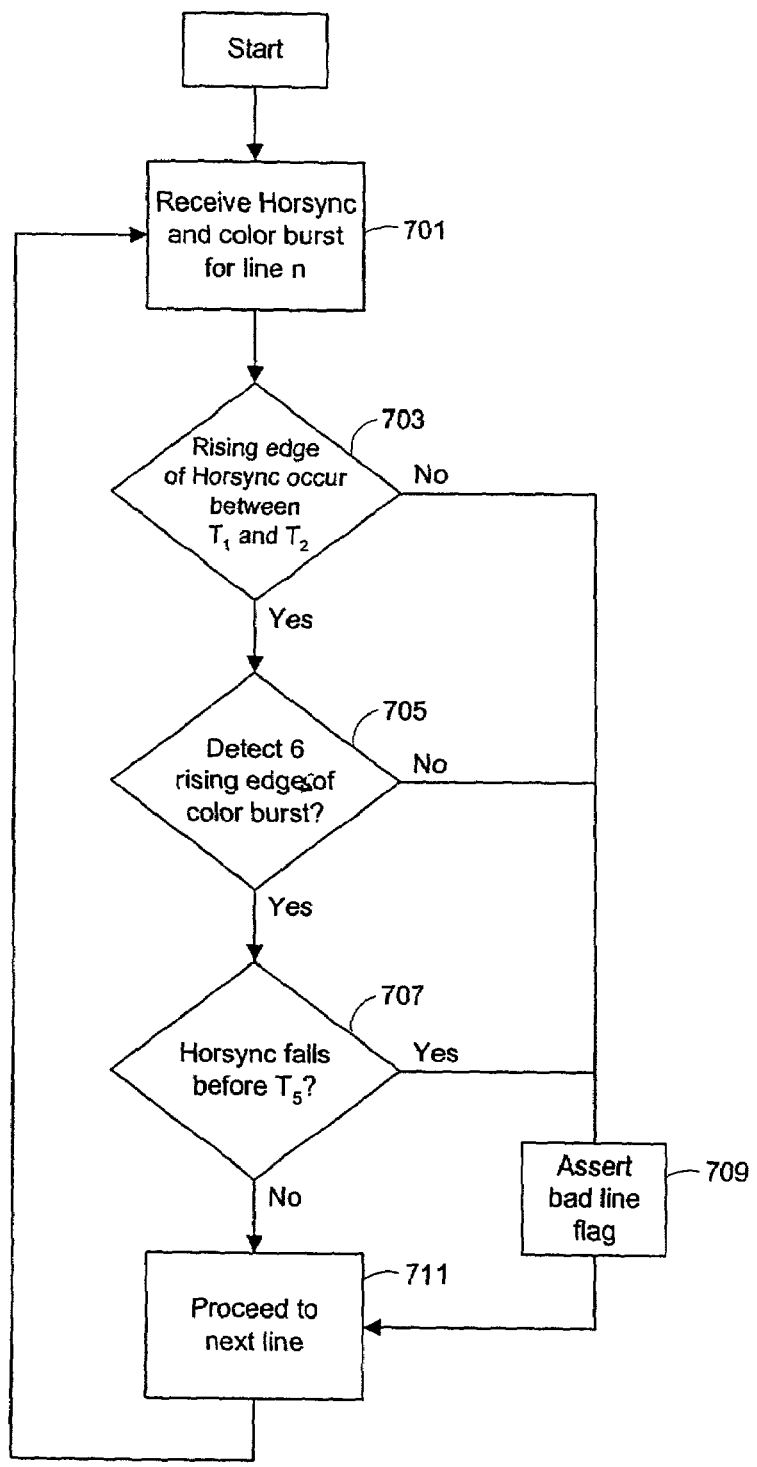
FIG. 7 is a flow chart illustrating a method for bad line detection in accordance with an embodiment of the present invention.

For ease of understanding, FIGS. 6, 7 in combination illustrates a process of video interference detection in detail according to an embodiment of the present invention. An example of NTSC composite video signal 600 corresponds to one line of composite video field. Video signal 600 includes Hor Sync 509, color burst 601, active video information 603. As shown in FIG. 6, active video signal 603 may suffer from external interference.

FIG. 6 and the table 1 below show a plurality of timing marks $T_0$, $T_1$, $T_2$, $T_3$, $T_4$, $T_5$ to indicate timing information of composite video line 600. In one example, composite video line 600 starts from $T_0$. In particular, $T_0$ indicates when the falling edge of Hor sync 509 for video line 600 appears. $T_1$ and $T_2$ define the rising edge of Hor sync 509. $T_3$ corresponds to the rising edge of color burst 601. $T_4$ corresponds to the end of a normal color burst 601. Color burst 601 normally lasts 2.5 microseconds for NTSC composite video. $T_5$ corresponds to the time that is 1 microsecond from the end of the line. In FIG. 6, $T_5$ should be understood as where the active video pulse of the previous video line ends. The timing information for each of the time marks $T_o$, $T_1$, $T_2$, $T_3$, $T_4$, $T_5$, when the color burst 601 frequency $F_c$ is at 3.57 MHz, is listed in table 1.

TABLE 1

Timing information for a composite video

| Time | $T_0$ (us) | $T_1$ (us) | $T_2$ (us) | $T_3$ (us) | $T_4$ (us) | $T_5$ (us) | $F_c$ (MHz) |
|---|---|---|---|---|---|---|---|
| NTSC | 0 | 4.7 − 0.3 = 4.4 | 4.7 + 0.3 = 5.0 | 5.8 | 8.3 | 62.5 | 3.57 |

Still referring to FIG. 6, amplified and clipped signal 510, corresponding to color burst 601, is shown as a series of square wave signal as generated by amplifier and clipper 501. Logic unit 502 is capable of counting the number of good burst edges within such clipped signal 510 during the color burst's 601 allotted time period i.e., 2.5 microseconds.

In accordance with the present invention, logic unit 502 test three conditions if a line can be declared as good. One embodiment of the three conditions required for a good line are listed below:

(1) The rising edge of the Hor sync 509 must occur between $T_1$ and $T_2$.
(2) There must be at least 6 rising edge pulses of signal 510 between $T_3$ and $T_4$.
(3) The Hor sync 509 must not have a falling edge before $T_5$.

The above three conditions correspond to characteristics of normal composite video signals. Normal composite video signal that was not damaged by external interference will keep right timing for its color burst and Hor sync pulse on each line. The present invention advantageously uses the inherent features of composite video signals to detect if the video signals are impacted by external interference.

If logic unit 502 detects that one condition is not satisfied, it generates a bad-line flag 311 to assert a bad line status for that specific line. In an alternative embodiment, logic unit 502 may use just one, or two of the three conditions as criteria to decide if a line is bad or not. It is not necessary to use all of these three conditions to make a determination of the line damage status. In particular, Hor sync 509 of a good line may often be interfered by noise and thus may have inaccurate timing information. An embodiment of the present invention may be configured not to use the condition of Hor sync 509 to determine whether a line is damaged.

FIG. 7 is a flow chart diagram of a method for detecting a bad line in a NTSC composite video frame according to one embodiment of the present invention. Logic unit 502 starts the detection process by receiving 701 Hor sync 509 and clipped color burst 510 corresponding to line n. Logic unit 502 resets its clock time to $T_0$ to zero once it detects the falling edge of Hor sync 509. Logic unit 502 first determines 703 if the rising edge of Hor sync 509 occurs between $T_1$ and $T_2$ as specified in table 1. If the rising edge does not appear between $T_1$ and $T_2$, logic unit 502 may conclude the line n is damaged and then sends 709 a bad line flag. If the rising edge of Hor sync 509 is detected, logic unit 502 continues to count the number of burst edges in the clipped signal 510. In one embodiment, if there are fewer than 6 edges detected by logic unit 502, the line is deemed as bad. Further, if logic unit 502 detects expected number of color bursts, logic unit 502 proceeds to check 707 when Hor sync 509 falls at the end of active video information 603. If Hor sync 509 falls prior to $T_5$, which corresponds to the time that normal NTSC video pulses end, the line is considered as being damaged. After line n passes all the above steps, logic unit 502 then processes 711 next line n+1. No bad-line flag is asserted for a good line.

In an alternative embodiment, besides counting the number of edges of color signal, another circuit may be provided to measure the energy level of the color burst signal 601. If the energy level of the color burst signal 601 is below or higher than a predetermined value, bad-line detector 305 may determine the color burst signal 601 is abnormal and the associated line may have been damaged.

Note that the embodiment described above is capable of checking one line each time. The result is independent from the actual condition of lines next to the line n that is currently examined by bad-line detector 305. Thus, the processing of each line is autonomous and is not dependent upon other lines on the same frame.

Note that although the foregoing description uses the sync timing information within NTSC composite video as example of performing interference detection, the principle is well applied to other raster-based video systems such as NTSC like or PAL like formats. One of ordinary skill in the art is able to practice the present invention based on the foregoing description. Again, the method provided herein for bad line detection is not limited to detecting inference from other radio frequency wireless radiation interference, but also detecting possible damages caused by other types of noise such as sporadic nulls.

Figure 8:
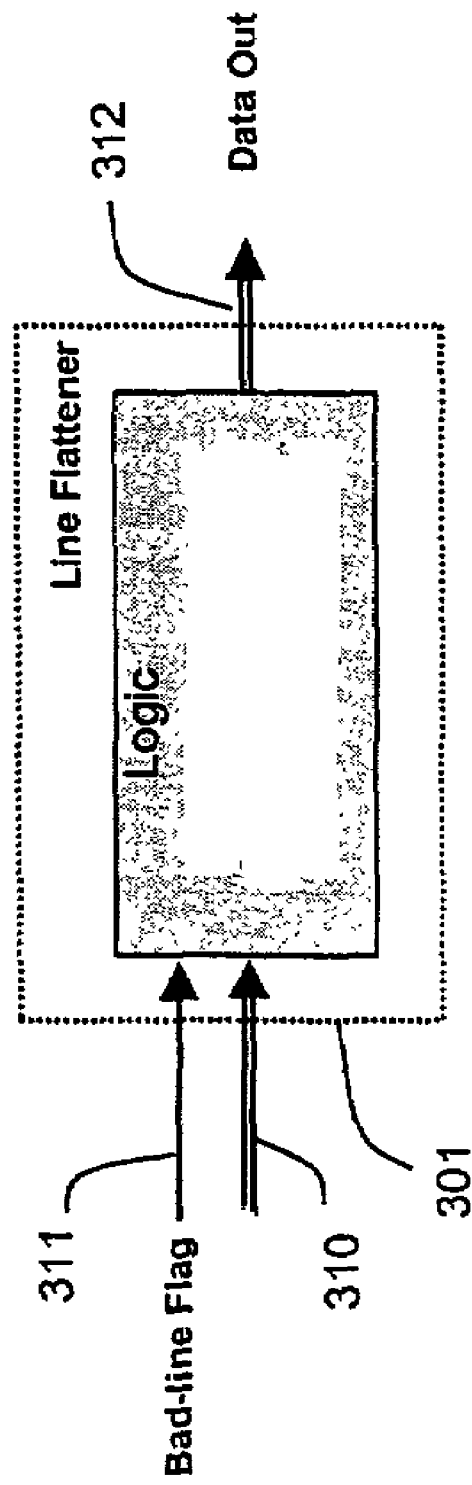
FIG. 8 is a block diagram illustrating an embodiment of the video line flattener.

FIG. 8 illustrates an embodiment of line flattener 301. Line flattener 301 processes bad lines in video images so that correction unit 115 can easily identify and repair the bad lines. In one embodiment, line flattener 301 has two inputs: (1) an input of video data 310, which may be digital video data in YUV format, 8 bits wide, received from video decoder 302; (2) bad-line flag 311 received from bad-line detector 305. Line flattener 301 has a data out 312, which may be an 8-bit wide data bus to transfer video data to compressor 307.

In accordance with one embodiment of the present invention, if a bad-line flag 311 is asserted on a certain line, then the data out 312 for that particular line is set to a same value. In one approach, video line flattener 301 flattens luminance and chrominance amplitude of all the pixels on a bad line to a same value, e.g., 50% of the highest amplitude. In one example, this value is 0×80 hexadecimal. This value is equal to gray for luminance or zero saturation for chrominance. If bad-line flag 311 is off, then video data on data output 312 equals to that of data input 310.

The advantage of line flattener 301 is to mark damaged line in a cost-effective approach. It can also remove possible noise that has been introduced into video data as a result of interference. The flattening processing also lessens subsequent compressing workloads and the data throughput requirement of the interface between detection unit 114 and correction unit 115.

Figure 9A:
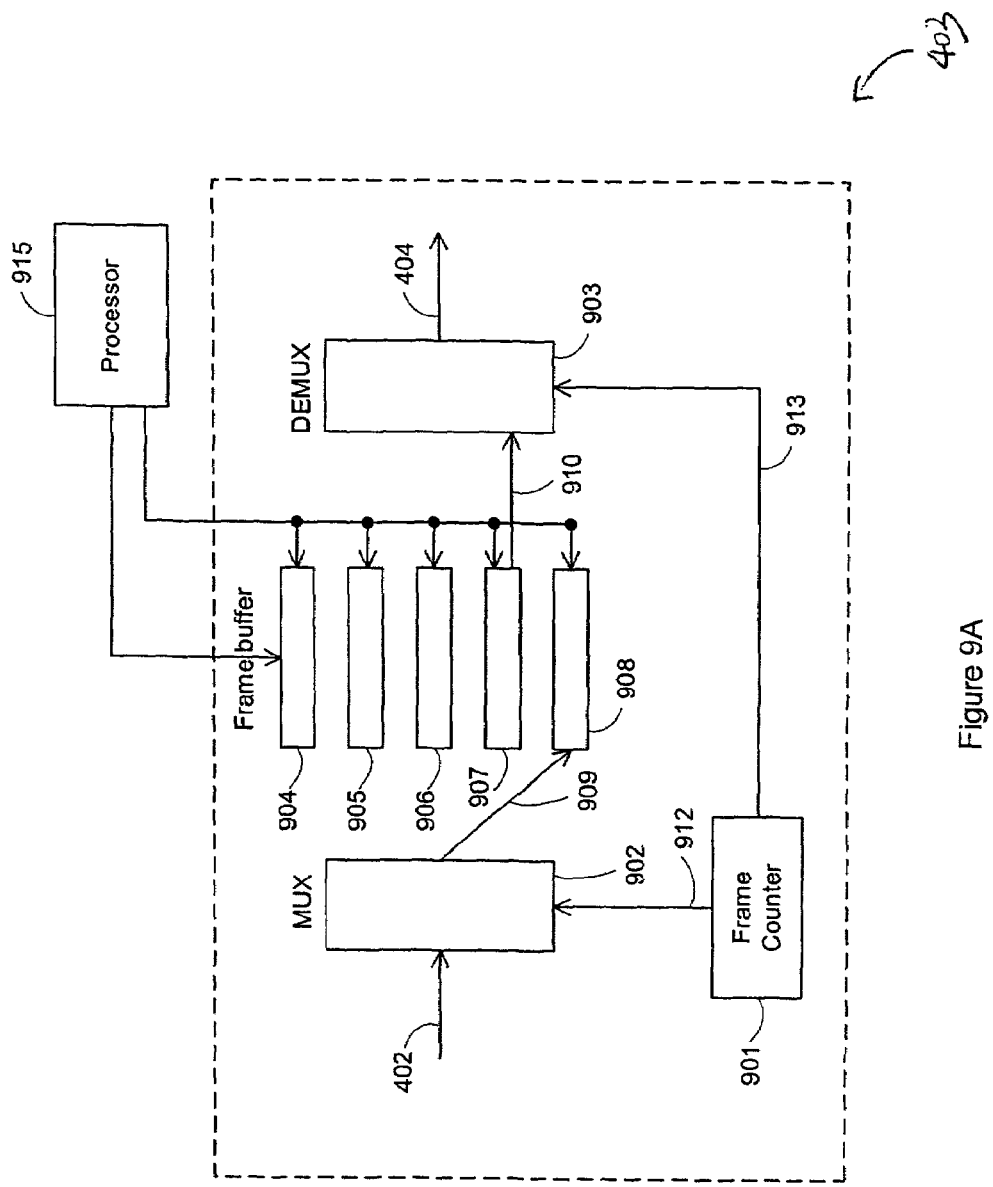
FIG. 9A is a block diagram illustrating an embodiment of bad-line replacement module.

FIG. 9A illustrates a block diagram of bad-line replacement module 403. To store video data for each frame, bad-line replacement module 403 contains five video frame buffers 904, 905, 906, 907 and 908. Bad-line replacement module 403 also has an input multiplexer (Mux) 902 and an output demultiplexer (Demux) 903. In one embodiment, Mux 902 has an 8-line data bus input coupled to input 402 and an 8-line data bus output 909 to each of the frame buffers 904–908. Demux 903 has an 8-line data bus input 910 coupled to each of the frame buffers 904–908 and a line data bus coupled to the output 404. Bad-line replacement module 403 further has a frame counter 901. Frame counter 901 is coupled to Mux 902 through signal line 912 and is coupled to Demux 903 through signal line 913. Frame counter 901 is configured to generate frame counts to control the operation of Mux 902 and Demux 903.

To operate bad-line replacement module 403, it should be understood that a processor 915 is coupled to video frame buffers 904–908. In a preferred embodiment, processor 915 may be the CPU (central processing unit) of computer 103. CPU of computer 103 is configured to directly control the bad line replacement process as described below. Alternatively, a dedicated processor such as a RISC processor may be used in replacement module 403 as processor 915 to operate replacement process.

Figure 9B:
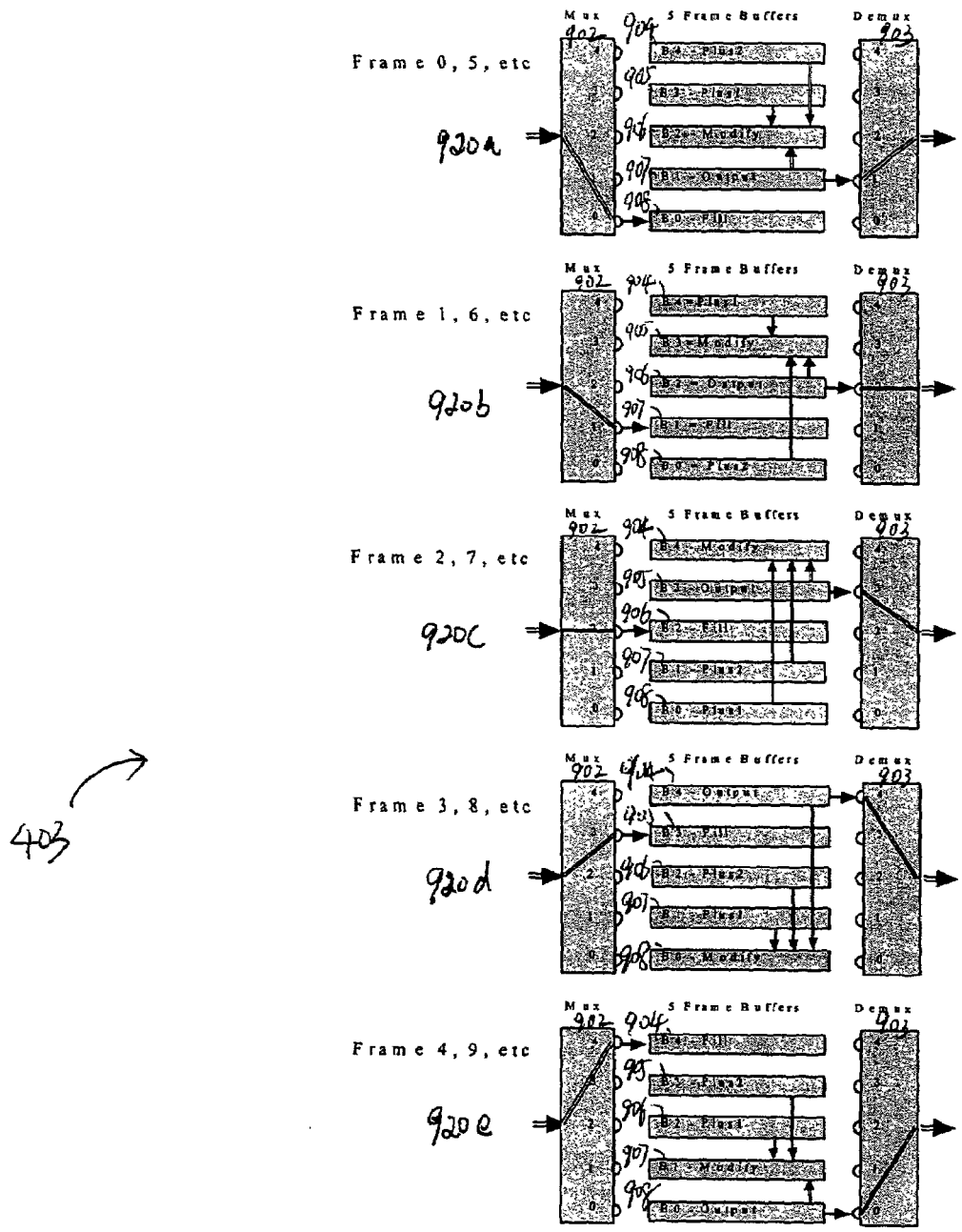
FIG. 9B is a schematic diagram illustrating a process of repairing bad lines in an embodiment of bad-line replacement module.

FIG. 9B further illustrates the operation of bad-line replacement module 403. During the operation of module 403, Mux 902 receives video data input from data bus 402. As mentioned above, video data input 402 carries data corresponding to each video frame. Mux 902 receives frame count 912 from frame counter 901 to select which frame is input to one of frame buffers 904–908. Demux 903 receives frame count 913 from frame counter 901 to select which frame buffer is used to output data. In one embodiment, frame count 912 and 913 include 3 bits. The Mux 902 selector is equal to the remainder of the frame count 912 divided by 5. Correspondingly, frame count 913 is equal to the remainder of (1+frame count 912) divided by 5.

As shown in FIG. 9B, 920a corresponds to a first stage: Mux 902 is feeding video data to buffer 908, which is designated as the "Fill" buffer while buffer 907 is designated as "Output" buffer to transfer data out through Demux 903. At this stage, buffer 904 stores a frame that is designated as "Plus2" frame; buffer 905 stores a frame that is designated as "Plus1" frame; buffer 906 stores a frame that is designated as "Modify" frame. A "Modify" frame means a frame that is scanned line by line for bad line replacement. As will be further understood, the "Output" frame, "Modify" frame, "Plus1" frame, "Plus2" frame and "Fill" frame are temporally related. When each of frames is displayed, the sequence of the displaying frames will start from "Output" frame as follows:

Output>Modify>Plus1>Plus2>Fill.

In a preferred embodiment, the lines on "Plus1", "Plus2" and "Output" frames are used to replace bad lines on "Modify" frame at each stage described herein. The detail of the line correction will be described below with reference to FIG. 10.

In next stage 920b, Mux 902 selects next frame to input into a new "Fill" buffer, buffer 907. Correspondingly, the stored frame data in buffer 908 becomes the "Plus2" frame; video data in buffer 906 is now "Output" frame selected by Demux 903; video data in buffer 905 is "Modify" frame; and video data in buffer 904 becomes "Plus1" frame.

In next stage 902c, Mux 902 selects buffer 906 as new "Fill" buffer to store next video frame. Correspondingly, the stored frame data in buffer 907 becomes the "Plus2" frame; video data in buffer 905 is now "Output" frame selected by Demux 903; video data in buffer 904 is "Modify" frame; and video data in buffer 908 becomes "Plus1" frame.

In next stage 902d, Mux 902 selects buffer 905 as new "Fill" buffer to store next video frame. Correspondingly, the stored frame data in buffer 906 becomes the "Plus2" frame; video data in buffer 904 is now "Output" frame selected by Demux 903; video data in buffer 908 is "Modify" frame; and video data in buffer 907 becomes "Plus1" frame.

In next stage 902e, Mux 902 selects buffer 904 as new "Fill" buffer to store next video frame. Correspondingly, the stored frame data in buffer 905 becomes the "Plus2" frame; video data in buffer 908 is now "Output" frame selected by Demux 903; video data in buffer 907 is "Modify" frame; and video data in buffer 906 becomes "Plus1" frame.

Note that in the embodiment described above, there is a delay of 4 frame times from the input of a frame to the output of the same frame. Therefore, accompanying audio signals 408 should be adjusted to match this delay. As mentioned above, the audio delay is done by module 409 in correction unit 115.

Figure 10:
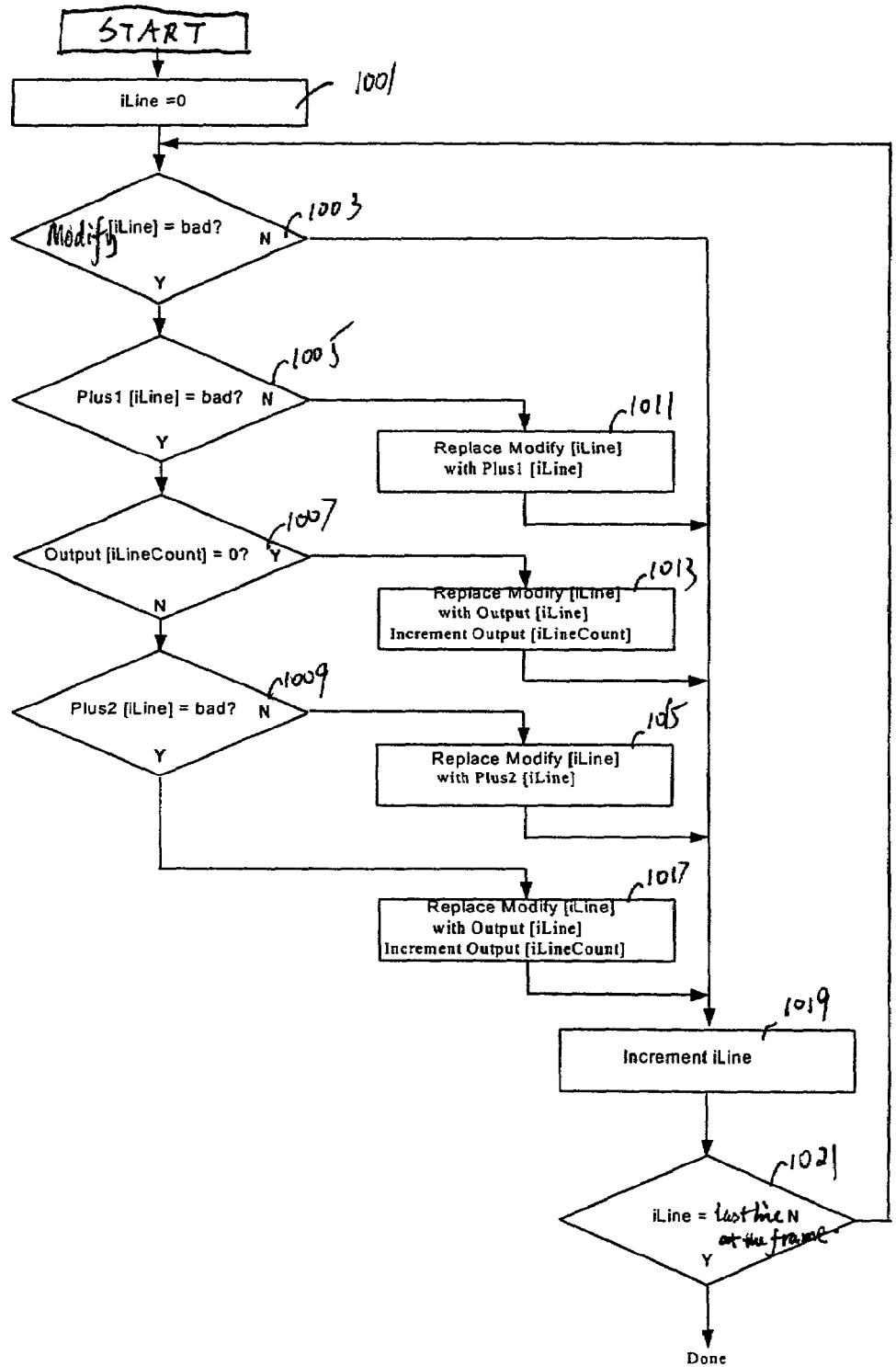
FIG. 10 is a flow chart of a method for bad line correction in accordance with an embodiment of the present invention.

FIG. 10 illustrates a method for repairing bad lines in a "Modify" frame. In a preferred embodiment, present invention replaces bad lines on a "Modify" frame from either the "Output" frame, the "Plus1" frame or the "Plus2" frame. As shown in FIG. 10, a count iLine represents the line on "Modify" frame that is currently checked for interference correction. iLine is initially set 1001 to zero. In each of "Output" frame, "Plus1" frame and "Plus2" frame, there is a matching line iLine that may be used to replace a bad line iLine on "Modify" frame.

In one aspect of the invention, an output count, iLinecount, is provided to determine if "Output" frame has been stuck on the same line for a given time. A user can use this information to know that he is not receiving anymore video or pictures.

To implement the output count for each line, a header is placed at the beginning of video data corresponding to each line. The placement of header can be done as the lines are being filled into the "Fill" buffer. In one approach, the header is 2 bytes and 15 bits is used as the output count, iLinecount. iLinecount is set to zero initially.

The remaining one bit in the line header can be used to mark the line as good or bad. Module 403 may preload such information into the line header via 415 while filling the frame into "Fill" buffer. Alternatively, module 403 can determine the condition of video data by directly checking if the video data for the entire line is set at a same value since video flattener 301 sets video data for a bad line to a same value. Thus, when filing a frame into "Fill" buffer, module 403 sets the line header appropriately to indicate the line status after sampling a number of pixel throughout the line (e.g., 32 pixels) and determining if they are all at 50% luminance.

During the operation, bad-line replacement module 403 checks 1003 if iLine on "Modify" frame is bad or not through the line header. If iLine is not damaged, the number of iLine is incremented 1019. Unless iLine is the last line at the "Modify" frame, module 403 continues to check next line. If all the lines on "Modify" frame are good, it will be output to video driver backend 405 when it becomes "Output" frame.

If iLine is a bad line, module 403 will check 1005 the condition of the same line on "Plus1" frame, which is stored in "Plus1" buffer. If the iLine on "Plus1" frame is good, module 403 replaces 1011 video data for iLine on "Modify" frame with corresponding data from iLine on "Plus1" frame.

If iLine on "Plus1" is also damaged as shown in the bit information in the header, module 403 will use equivalent iLine on "Output" frame to repair the bad line of "Modify" frame. To do this, module 403 checks 1007 if the output count "iLinecount" at the "Output" frame is zero or not. If the iLinecount is zero, iLine on "Output" frame is used to replace 1013 video data of iLine on "Modify" frame and output count (iLinecount) for iLine on "Output" frame is incremented by one.

If "iLinecount" for the line on "Output" frame is not "zero", it may means that the same line "Output" frame has been previously used for line repairing, which would otherwise not happen had "Output" frame not been stuck for some reason. In such situation, module 403 will use 1009 "Plus2" frame to repair "Modify" frame. Similar to what has been described above, if iLine on "Plus2" buffer is good, module 403 replaces 1015 video data for iLine on "Modify" frame with corresponding data for iLine on "Plus2" frame. If iLine on "Plus2" frame is not good or may not exist at all, module 403 will still use iLine on "Output" frame 1017 to replace the line on "Modify" frame. Simultaneously, the iLinecount on the "Output" frame will also be incremented.

Note that the method above not only corrects lost data due to interference, but also takes into account of temporary suspension of video transmission from transmission end 109 for some reason. As shown in step 1017, this method has the advantage of latching the last "Output" frame image if signal 105 is lost, i.e., "Plus2" frame does not have good lines as replacement module 403 tries to load new images. When the signal 105 comes back, the output frame can still use a stored frame that is ahead of normal frame to repair bad lines.

It should be understood that the method above is also applied to video data 402 stored in other forms. As mentioned above, in an alternative embodiment, video decompressor 401 can generate video data 402 corresponding to an interlaced video field instead of a video frame. In this condition, the bad-line replacement module 403 and the above method can be slightly modified to process such interlaced video data for bad line replacement.

For example, the buffers 904–908 will load data on contiguous video fields instead of contiguous video frame. To replace a bad line iLine on a "Modify" field, assuming the Modify field is an odd line field and "Plus 1" field is an even line field, the matching line on "Plus1" field for line replacement will be iLine+1 or iLine−1. To replace bad line, data of matching line on a selected frame, e.g., "Plus1" frame, can be used. Alternatively, an average of iLine+1 or iLine−1 on the selected frame will be used to substitute the bad line iLine on "Modify" frame. By doing so, bad lines on "Modify" field are corrected using matching lines on other video fields.

It should also be understood that the embodiment described herein to correct the bad lines using good lines in other frames is preferably implemented for still images or slow motion video captured by transmission end 101. For still images and slow motion video generated by a raster based system, the images on each frame or field usually have good spatial correlation. Thus, the replacement of bad lines with lines on temporally-close frames may achieve a desired improvement of graphic quality. If the graphics sent from transmission end 101 contain fast motion, the embodiment described above may need modification to take into account the spatial correlation between the frames. For example, if it is determined that the delta between the "Modify" frame and the "Plus 1" frame as shown in FIGS. 9A, 9B and 10 exceeds a pre-determined value, the correction unit 103 may instruct not to perform the replacement using lines on the "Plus 1" frame. By doing so, the correction unit 103 avoids any problem that could be caused by the lack of good spatial correlation.

In view of the foregoing description, the method and system in accordance with the present invention provides a number of advantages and benefits. For example, in an FHSS environment, the dynamic interference detection and correction system detects the interference caused to NTSC or NTSC like video signals and adaptively replaces the damaged signals. The detection unit may be configured to detect the condition of sync timing signals, such as the presence of the color burst or horizontal sync pulse on the video signals, in order to determine the interference impact on the lines. In doing so, the method and system of interference detection and correction may operate with a wide variety of raster graphics source without imposing specific requirements for video sources. Another advantage provided by the present invention is to replace the damaged lines in the video signals with good lines on other contiguous fields. The present invention advantageously stores and selects matching line on contiguous video frames to replace the damaged lines. The replacement improves the quality of the video images that will be ultimately displayed or further enhanced in other digital photography techniques.

Upon reading this disclosure, those of skill in the art will appreciate still additional alternative methods and designs for a system and method of dynamically detecting f and correcting radio frequency interference in accordance with the present invention. For example, video flattener 301 may be replaced by other functionality module if video interface 319 supports high data throughput so that video decoder 302 may directly send component video data to replacement module 403 in correction unit 115. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims. Accordingly, the disclosure of the present invention is intended to be illustrative, but not limiting, of the scope of the invention, which is set forth in the following claims.

What is claimed is:

1. A system of detecting radio frequency interference and correcting damaged composite video data signal, comprising:
   a detection unit for receiving a composite video signal to detect whether interference causes damage to the received composite video data signal and, for identifying a damaged portion of the received composite video data signal; and
   a correction unit, communicatively coupled with the detection unit, for correcting the damaged portion of the composite video data signal in response to identification of the damaged portion of the composite video data signal by replacing the damaged portion of the composite video signal with an equivalent portion of video data corresponding to the damaged portion of the composite video signal.

2. The system of claim 1, further comprising:
   a transmission end for generating the composite video signal and transmitting the composite video signal to the detection unit.

3. The system of claim 2, wherein the transmission end comprises:

a video sensor for capturing video image;
an encoder, coupled to the video sensor, for converting captured video image into the composite video data signal; and
a transmitter, coupled to the encoder, for transmitting composite video data signal to the detection unit.

4. The system of claim 3, wherein the transmission end further comprises:
a microphone for recording audio signal and for transmitting audio signal to the transmitter.

5. The system of claim 3, wherein the composite video data signal is a NTSC compliant video signal.

6. The apparatus of claim 3, wherein the composite video data signal is a PAL compliant video signal.

7. A method of detecting external interference within a composite video signal representing a line on a video image, comprising the steps of:
receiving the composite video signal;
detecting whether a color burst pulse is damaged in the composite video signal;
generating a detection flag in response to the condition of the color burst in the composite video signal; and
replacing, in response to the detection flag, the color burst pulse that is damaged with an equivalent pulse corresponding to the damaged color burst pulse.

8. The method of claim 7, further comprising:
detecting whether a horizontal synchronization pulse is damaged in the composite video signal.

9. A system of detecting radio frequency interference and correcting a damaged composite video data signal, comprising:
a detection unit for receiving a composite video signal, detecting whether interference causes damage to the received composite video data signal, and identifying a damaged portion of the received composite video data signal; and
a correction unit, communicatively coupled with the detection unit, for identifying the damaged portion of the composite video data signal for correction,
wherein the detection unit further comprises:
a receiver module for receiving the composite video data signal,
a bad-line detector, coupled to the receiver module, for determining if the composite video data signal is damaged by detecting whether a predetermined portion of the composite video data signal is present and, in response to detecting damage, generating a detection flag to indicate the damaged video data signal,
a video decoder, coupled to the receiver module, for converting the composite video data signal into component video data signal, and
a line flattener, coupled to the video decoder and the bad-line detector, for receiving the detection flag and modifying a corresponding damaged portion of component video data to a predetermined value.

10. The system of claim 9, further comprising a mute control module, coupled to the receiver module and the bad-line detector, for muting audio signals associated with damaged portion of composite video signal in response to receiving the detection flag from the bad-line detector.

11. The system of claim 9, further comprising a video compressor, coupled to the line flattener, for compressing the component video data and transmitting to the correction unit.

12. The system of claim 9, wherein the bad-line detector further comprises:

a filter for receiving the composite video data signal from the receiver module and for outputting the color burst signal of the composite video data signal;
a color burst processing module, coupled to the filter, for amplifying and converting the color burst signal into a color burst square wave;
a synchronization detector, coupled to the receiver module, for detecting and outputting a horizontal synchronization signal in the composite video data signal; and
a logic unit, coupled to the color burst processing module and the synchronization detector, for detecting if the color burst signal and the horizontal synchronization signal have been damaged by interference and for generating the detection flag in response to determination of the damage caused by interference.

13. The system of claim 12, wherein the logic unit is further configured to count a number of color burst edges in the color burst square wave.

14. The system of claim 12, wherein the logic unit is further configured to detect if the horizontal synchronization signal of each composite video line has a rising edge at a first predetermined time.

15. The system of claim 12, wherein the logic unit is further configured to detect if the horizontal synchronization signal of each composite video line has a falling edge at a second predetermined time.

16. The system of claim 12, wherein the detection flag is a bad-line flag.

17. A system of detecting radio frequency interference and correcting a damaged composite video data signal, comprising:
a detection unit for receiving a composite video signal, detecting whether interference causes damage to the received composite video data signal, and identifying a damaged portion of the received composite video data signal; and
a correction unit, communicatively coupled with the detection unit, for identifying the damaged portion of the composite video data signal for correction,
wherein the correction unit further comprises:
a video decompressor, coupled to the detection unit, for storing video data corresponding to the composite video data signal and for decompressing the stored video data wherein the stored video data correspond to video frames,
a bad-line logic, coupled to the video compressor, for identifying the damaged portion in the stored video data, the damaged portion being detected and marked by the detection unit, and
a bad-line replacement module, coupled to the video decompressor and the bad-line logic, for replacing damaged portion in the stored video data with good video data.

18. The system of claim 17, further comprising:
an audio stream assembly, coupled to the detection unit, for transferring audio signals in the composite video data signal;
an audio delay module, coupled to the audio stream assembly, for delaying audio signals; and
an audio driver backend, coupled to the audio delay module, for transferring delayed audio signals to an audio processing module.

19. The system of claim 17, further comprising a video driver backend, coupled to the bad-line replacement module, for transferring repaired video data to a video application processing module.

20. The system of claim 17, wherein the bad-line replacement module comprises:

a plurality of buffers for storing the video data;

an input multiplexer, coupled to each of the plurality of buffers, for receiving the video data and selecting one of the plurality of the buffers to store video data corresponding to one video frame; and an output multiplexer, coupled to each of the plurality of buffers, for selecting one of the plurality of the buffers to output video data corresponding to one video frame.

21. A computer readable medium configured to store instructions executable by a processor, the instructions structured for:

detecting whether a color burst pulse is damaged in the composite video signal;

generating a detection flag in response to the condition of the color burst in the composite video signal; and replacing, in response to the detection flag, the color burst pulse that is damaged with an equivalent pulse corresponding to the damaged color burst pulse.

22. The computer readable medium of claim 21, wherein the instructions are further structured for detecting whether a horizontal synchronization pulse is damaged in the composite video signal.

* * * * *